(12) United States Patent
Tomarchio et al.

(10) Patent No.: US 12,483,042 B2
(45) Date of Patent: Nov. 25, 2025

(54) POWER SUPPLY APPARATUS FOR ELECTRIC SYSTEMS

(71) Applicant: ABB Schweiz AG, Baden (CH)

(72) Inventors: Salvatore Tomarchio, Dalmine (IT); Marco Testa, Romano di Lombardia (IT)

(73) Assignee: ABB SCHWEIZ AG, Baden (CH)

( * ) Notice: Subject to any disclaimer, the term of this patent is extended or adjusted under 35 U.S.C. 154(b) by 31 days.

(21) Appl. No.: 18/514,446

(22) Filed: Nov. 20, 2023

(65) Prior Publication Data
US 2024/0186801 A1    Jun. 6, 2024

(30) Foreign Application Priority Data
Dec. 6, 2022   (EP) ..................... 22211809

(51) Int. Cl.
*H02J 7/00*   (2006.01)
*H02J 7/34*   (2006.01)

(52) U.S. Cl.
CPC ............ *H02J 7/0013* (2013.01); *H02J 7/345* (2013.01); *H02J 2207/20* (2020.01)

(58) Field of Classification Search
CPC ....... H02J 7/0013; H02J 7/345; H02J 2207/20
See application file for complete search history.

(56) References Cited

U.S. PATENT DOCUMENTS

| 4,536,704 A | 8/1985 | Burkum et al. |
| 2019/0319457 A1* | 10/2019 | Di Maio ................... H02J 3/32 |
| 2020/0112065 A1* | 4/2020 | Eliassen ................ H02J 7/0025 |

FOREIGN PATENT DOCUMENTS

CN       212627717 U    2/2021

OTHER PUBLICATIONS

European Extended Search Report, Application No. 22211809.3, dated May 23, 2023, 7 pps.
B.E. Fridman et al., "0.5MJ 18KV Modules of Capacitive Energy Storage", Pulsed Power Conference, Jun. 28, 2009, pp. 61-65.

* cited by examiner

*Primary Examiner* — Carlos Amaya
(74) *Attorney, Agent, or Firm* — Michael M. Gnibus; McCarter & English, LLP

(57) ABSTRACT

The present disclosure relates to a power supply apparatus for an electric system including an AC/DC conversion unit electrically connectable to an AC electric power source, said conversion unit being configured to receive an AC input voltage and provide in output a DC charging voltage, a capacitor bank including a plurality of storage capacitors operatively coupled to said conversion unit to be charged in parallel by said conversion unit, each storage capacitor having a first terminal configured to receive a charging current provided by said AC/DC conversion unit, a DC bus electrically connectable to one or more electric loads, said DC bus being configured to feed said electric loads with a DC feeding voltage, and a plurality of current blocking devices electrically connected between said capacitor bank and said DC bus.

11 Claims, 3 Drawing Sheets

POWER SUPPLY APPARATUS FOR ELECTRIC SYSTEMS

CROSS REFERENCE TO RELATED APPLICATIONS

This patent application claims the benefit and priority of European Patent Application No. 22211809.3 filed on Dec. 6, 2022, the disclosure of which is incorporated by reference herein in its entirety as part of the present application.

BACKGROUND

The present disclosure relates to a power supply apparatus for electric systems, for example electric power distribution grids, electrical switchboards, electrical panels, and the like.

As is known, an electric system often includes a power supply apparatus to provide an auxiliary power supply to a number of electric or electronic devices operatively associated to the primary equipment. As an example, in an electric system including a MV switchgear, a power supply apparatus is typically arranged to feed the devices included in the control cabinet. A power supply apparatus normally includes an AC/DC converter electrically connected to an AC electric source, for example an electric line. A capacitor bank, which includes a plurality of storage capacitors, is electrically connected between the AC/DC converter and a DC bus feeding a number of electric loads.

In most recent power supply apparatuses, a current limiter may be electrically connected between the AC/DC converter and the capacitor bank in order to limit the charging current provided in output by the AC/DC converter.

Currently available power supply apparatuses show some problematic aspects in relation to their reliability in operation.

Since the storage capacitors are basically connected electrically in parallel, a fault in a storage capacitor may be fed by the remaining non-faulted capacitors as these latter may result short-circuited on the electric fault. Such an occurrence can quickly lead to the failure of the whole capacitor bank with a consequent interruption of the power supply to the electric loads.

As it is easily to understand, the above-mentioned issue results particularly critical in electric systems (e.g., subsea electric installations), for which maintenance interventions are quite difficult and expensive.

Additionally, traditional power supply apparatuses provide relatively poor performances in relation to the diagnostics of possible faults in the storage capacitors, which makes more difficult an effective scheduling of possible maintenance interventions.

BRIEF DESCRIPTION

Embodiments of the present disclosure provide a power supply apparatus for electric systems, which solves or mitigates the above-mentioned problems.

More particularly, an embodiment of the present disclosure provides a power supply apparatus capable of providing high performances in terms of reliability in operation.

Still another embodiment of the present disclosure provides a power supply apparatus capable of providing advanced diagnostic functionalities of the operation of the capacitor bank.

Yet another embodiment of the present disclosure provides a power supply apparatus having a compact size and easy to install in an electric system.

Another embodiment of the present disclosure provides a power supply apparatus that can be easily manufactured at industrial level, at competitive costs with the power supply apparatuses of the state of the art.

The present disclosure thus provides a power supply apparatus for electric systems, according to the embodiments described herein.

The power supply apparatus of the invention includes:
  an AC/DC conversion unit electrically connectable to an AC electric power source. Said conversion unit is configured to receive an AC input voltage and provide in output a DC charging voltage;
  a plurality of storage capacitors operatively coupled to said conversion unit to be charged in parallel by said conversion unit. Each storage capacitor has a first terminal configured to receive a charging current provided by said AC/DC conversion unit;
  a DC bus electrically connectable to one or more electric loads, said DC bus being configured to feed said electric loads with a DC feeding voltage; and
  a plurality of current blocking devices, each having a third terminal electrically connected to the first terminal of a corresponding storage capacitor and a fourth terminal electrically connected to said DC bus.

The above-mentioned current blocking devices are configured to allow the flow of feeding currents from said storage capacitors to said electric loads and are configured to block currents having opposite directions relative to said feeding currents.

According to an aspect of the disclosure, the power supply apparatus includes a plurality of current limiters. Each current limiter is electrically connected in series between said AC/DC conversion unit and a corresponding storage capacitor. Each current limiter is configured to set a charging current provided by said AC/DC conversion unit to charge the corresponding storage capacitor depending on control signals received in input.

According to an aspect of the disclosure, the power supply apparatus includes a plurality of capacitor dischargers. Each capacitor discharger is electrically connected in parallel to a corresponding storage capacitor. Each capacitor discharger is configured to discharge the corresponding storage capacitor with a discharging current selectable depending on control signals received in input.

According to an aspect of the disclosure, the power supply apparatus includes a control unit including data processing resources. Said control unit may be configured to control the operation of said AC/DC conversion stage, said current limiters and said capacitor dischargers.

According to an aspect of the disclosure, the power supply apparatus includes a plurality of sensor units. Each sensor unit is configured to provide said control unit with detection signals indicative of currents and voltages at the first terminal of a corresponding storage capacitor.

According to an aspect of the disclosure, the aforesaid control unit is configured to carry out diagnostic procedure of said storage capacitors, which includes the following steps:
  commanding said AC/DC conversion unit to provide in output a DC charging voltage;
  for each storage capacitor, commanding the corresponding current limiter to set a first charging current lower than a predefined charging current;
  for each storage capacitor, commanding the corresponding current limiter to block the charge of said storage capacitor, when the voltage across said storage capacitor is higher than said first threshold voltage value;

for each storage capacitor, calculating a charging time taken by the voltage across of said storage capacitor to reach said first threshold voltage value;

comparing the calculated charging time of each storage capacitor with a threshold charging time; and determining that a reforming process of a storage capacitor is needed, if the charging time of said storage capacitor is higher than said threshold charging time.

According to an aspect of the disclosure, the aforesaid diagnostic procedure of said storage capacitors further includes the following steps, if the calculated charging time of each storage capacitor is lower than or equal to said threshold charging time: for each storage capacitor, commanding the corresponding current limiter to set a second charging current corresponding to said predefined charging current; for each storage capacitor, commanding the corresponding current limiter to block the charge of said storage capacitor, when the voltage across said storage capacitor is higher than said second threshold voltage value.

According to an aspect of the disclosure, the aforesaid diagnostic procedure of said storage capacitors further includes the following steps:

for each storage capacitor, commanding the corresponding capacitor discharger to discharge said storage capacitor for a predefined discharge time with a discharging current corresponding to a predefined feeding current absorbed by said one or more electric loads as a whole;

for each storage capacitor, commanding the corresponding capacitor discharger to block the discharge of said storage capacitor, when said predefined discharge time has passed;

for each storage capacitor, calculating a capacitance value;

comparing the calculated capacitance value of each storage capacitor with a threshold capacitance value;

for each storage capacitor, determining that a dielectric fault is present, if the calculated capacitance value is lower than a threshold capacitance value.

In a further aspect, the present disclosure concerns an electric installation, according to the embodiments described herein.

BRIEF DESCRIPTION OF THE DRAWINGS

Further characteristics and advantages will emerge from the description of example, but not exclusive, embodiments of the disclosure, non-limiting examples of which are provided in the attached drawings, wherein.

DETAILED DESCRIPTION

Figure 1:
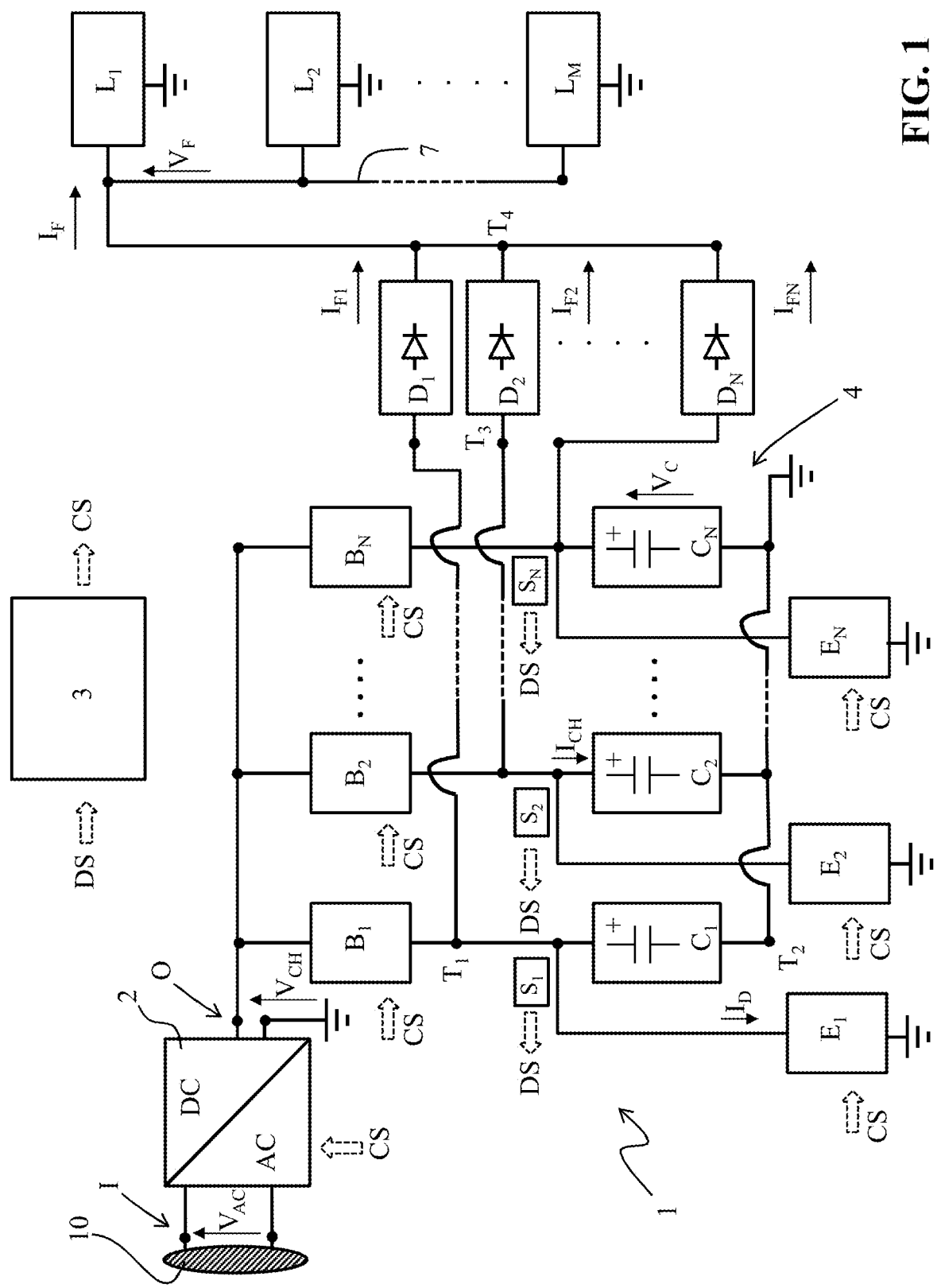
FIG. 1 is a block scheme of the power supply apparatus, according to the disclosure.

Referring to the cited figures, the present disclosure relates to a power supply apparatus 1, for example electric power distribution grids, electric switchboards, electric panels, and the like.

The power supply apparatus 1 is particularly adapted for use in medium-voltage electric systems (thereby operating at voltages higher than 1 KV AC and 1.5 kV DC and lower than 72 kV AC and 100 kV DC).

More particularly, the power supply apparatus 1 is adapted for use in subsea electric installations and it will be described in the following with particular reference to these applications, for the sake of simplicity.

The power supply apparatus 1, however, may be employed in electric systems of different type, namely in any electric installation where high levels of reliability in operation are required.

In general terms, the power supply apparatus 1 is configured to harvest electric energy from an AC electric power source 10 and feed one or more electric loads $L_1, L_2, \ldots, L_M$ with a DC power supply.

In principle, the AC electric power source 10 and the electric loads $L_1, L_2, \ldots, L_M$ may be of any type, according to the needs.

The electric power source 10 may include, for example, a MV electric line or system while a generic electric load may include, for example, a DC/DC converter feeding an electronic module, a protection device electrically connected in series to an electronic module, an electric or electronic device, or the like.

According to the disclosure, the power supply apparatus 1 includes an AC/DC conversion unit 2, which can be electrically connected to the electric power source 10.

The conversion unit 2 is configured to receive an AC input voltage $V_{AC}$ from the electric power source 10 and provide in output a DC charging voltage $V_{CH}$.

The conversion unit 2 has an input I including a pair of input terminals which, in operation, are electrically connected to the electric power source 10 to receive the input voltage $V_{AC}$.

The conversion unit 2 has an output O including a pair of output terminals making available the charging voltage $V_{CH}$. The output O may have an output terminal providing a charging voltage $V_{CH}$ relative to ground and the other output terminal put at a ground voltage.

As it will be more apparent from the following, the conversion unit 2 operates in response to suitable input control signals CS. For example, based on said control signals, it may vary the level of the charging voltage $V_{CH}$ made available at the output O.

In a practical implementation of the disclosure, the conversion unit 2 may include advantageously a suitable AC/DC power switching converter realized at industrial level according to solutions of known type. For example, the conversion unit 2 may include an AC/DC converter of the flyback type or half-bridge type.

According to the disclosure, the power supply apparatus 1 includes a capacitive bank 4 including a plurality of storage capacitors $C_1, C_2, \ldots, C_N$ operatively coupled to the conversion unit 2 in such a way to be charged in parallel by this latter.

Each storage capacitor $C_1, C_2, \ldots, C_N$ has opposite first and second terminals $T_1, T_2$ electrically connected to corresponding internal electric armatures having opposite voltage polarities.

The first terminal $T_1$ (conventionally having a positive voltage polarity) of each storage capacitor $C_1, C_2, \ldots, C_N$ is configured to receive a charging current $I_{CH}$ provided by the AC/DC conversion unit.

As mentioned above, in general terms, the storage capacitors $C_1, C_2, \ldots, C_N$ are electrically connected in parallel one to another, namely between the output O of the conversion unit 2 and the ground.

The storage capacitors $C_1, C_2, \ldots, C_N$ may have their first terminals $T_1$ electrically connected in parallel, in a direct or indirect manner, to the conversion unit 2, more particularly to the output terminal put at a voltage $V_{CH}$ relative to ground.

The storage capacitors $C_1, C_2, \ldots, C_N$ may have their second terminals $T_2$ electrically connected in parallel to ground.

According to the embodiments shown in the cited figures, the power supply apparatus 1 includes a plurality of current limiters $B_1, B_2, \ldots, B_N$, each electrically connected in series between the AC/DC conversion unit 2 and a corresponding storage capacitor $C_1, C_2, \ldots, C_N$.

Each current limiter $B_1, B_2, \ldots, B_N$ is configured to set a charging current $I_{CH}$ provided by the AC/DC conversion unit 2 to charge a corresponding storage capacitor $C_1, C_2, \ldots, C_N$ depending on suitable control signals CS received in input.

Each current limiter $B_1, B_2, \ldots, B_N$ may have an input terminal electrically connected to the output O of the conversion unit 2 (namely to the output terminal providing a voltage $V_{CH}$ relative to ground) and an output terminal electrically connected to the first terminal $T_1$ of the corresponding storage capacitor.

In general, the current limiters $B_1, B_2, \ldots, B_N$ may be realized at industrial level according to solutions of known type. For example, they may include suitable power circuits configured to provide current foldback functionalities.

According to the embodiments shown in the cited figures, the power supply apparatus 1 further includes a plurality of capacitor dischargers $E_1, E_2, E_N$, each electrically connected in parallel to a corresponding storage capacitor $C_1, C_2, \ldots, C_N$.

Each capacitor discharger $E_1, E_2, \ldots, E_N$ is configured to discharge the corresponding storage capacitor $C_1, C_2, \ldots, C_N$ with a discharging current $I_D$ that can be set depending on suitable control signals CS received in input.

Each capacitor discharger $E_1, E_2, E_N$ may have an input terminal electrically connected to the first terminal $T_1$ of the corresponding storage capacitor $C_1, C_2, \ldots, C_N$ and an output terminal electrically connected to the second terminal $T_2$ of the corresponding storage capacitor.

In general, the capacitor discharger $E_1, E_2, \ldots, E_N$ may be realized at industrial level according to solutions of known type. For example, they may include suitable power circuits configured to make available, in a selectable manner, current paths having different equivalent resistances in parallel to the first terminal $T_1, T_2$ of the corresponding storage capacitor.

According to the disclosure, the power supply apparatus 1 includes a DC bus 7, which can be electrically connected to the one or more electric loads $L_1, L_2, \ldots, L_M$.

The DC bus 7 is configured to feed the electric loads $L_1, L_2, \ldots, L_M$ with a DC feeding voltage $V_F$. In operation, the electric loads $L_1, L_2, \ldots, L_M$ are electrically connected in parallel to the DC bus 7 and they absorb an overall feeding current $I_F$.

In general, the DC bus 7 may be realized at industrial level according to solutions of known type. For example, it may be formed by a suitable power conductor having multiple pairs of terminals electrically connectable to the electric loads.

An essential aspect of the disclosure consists in that the power supply apparatus 1 includes a plurality of current blocking devices $D_1, D_2, \ldots, D_N$ electrically connected in parallel between the capacitor bank 4 and the DC bus 7.

Each current blocking device $D_1, D_2, \ldots, D_N$ has a third terminal $T_3$ electrically connected to the first terminal $T_1$ (the terminal receiving the charging current $I_{CH}$) of a corresponding storage capacitor $C_1, C_2, \ldots, C_N$ and a fourth terminal $T_4$ electrically connected to the DC bus. The current blocking devices $D_1, D_2, \ldots, D_N$ are configured to allow corresponding feeding currents $I_{F1}, I_{F2}, \ldots, I_{FN}$ to flow from the storage capacitors $C_1, C_2, \ldots, C_N$ to the electric loads $L_1, L_2, \ldots, L_M$ and are configured to block possible currents flowing according to opposite directions relative to the above-mentioned feeding currents $I_{F1}, I_{F2}, \ldots, I_{FN}$.

Each current blocking device $D_1, D_2, \ldots, D_N$ may be configured to switch in a conduction state, at which said current blocking device allows the flow of a current according to a predefined conduction direction, and in an interdiction state, at which said blocking device interrupts the flow of a current passing therethrough.

The switch of a generic blocking device $D_1, D_2, \ldots, D_N$ from said conduction state to said interdiction state, and vice versa, basically depends on a voltage difference applied between the third and fourth terminals $T_3, T_4$ of said current blocking device.

Each current blocking device $D_1, D_2, \ldots, D_N$ may be arranged in such a way to switch in said conduction state, if the third terminal $T_3$ (in practice the first terminal $T_1$ of the corresponding storage capacitor $C_1, C_2, \ldots, C_N$) takes a voltage $V_C$ higher than the feeding voltage $V_F$ of the DC bus, and switch in said interdiction state, if the third terminal $T_3$ (in practice the first terminal $T_1$ of the corresponding storage capacitor $C_1, C_2, \ldots, C_N$) takes a voltage $V_C$ lower than the feeding voltage $V_F$ of the DC bus 7.

The arrangement of the current blocking devices $D_1, D_2, \ldots, D_N$ provides relevant advantages, particularly when a storage capacitor is subject to fault conditions.

In normal conditions, the blocking devices $D_1, D_2, \ldots, D_N$ are in a conduction state, and they allow the storage capacitors $C_1, C_2, \ldots, C_N$ to feed the electric loads $L_1, L_2, \ldots, L_M$ by providing suitable feeding currents $I_{F1}, I_{F2}, \ldots, I_{FN}$ to the DC bus.

When a given storage capacitor $C_1$ is subject to a fault, the corresponding blocking device $D_1$ naturally switches in an interdiction state as the first terminal $T_1$ of the storage capacitor $C_1$ is short-circuited to ground. In this way, the feeding currents $I_{F2}, \ldots, I_{FN}$ provided by the remaining storage capacitors $C_2, \ldots, C_N$ cannot flow towards the faulted storage capacitor $C_1$ and continue to flow towards the electric loads $L_1, L_2, \ldots, L_M$.

In practice, the blocking device $D_1$ associated to the faulted storage capacitor $C_1$ prevents that the electric fault is fed by electric energy stored by the remaining storage capacitors $C_2, \ldots, C_N$. The faulted storage capacitor $C_1$ is thus isolated from the other storage capacitors $C_2, \ldots, C_N$ and the power supply apparatus can still feed the electric loads $L_1, L_2, \ldots, L_M$. The fault of a single storage capacitor $C_1$ thus does not jeopardize the overall operation of the power supply apparatus.

The blocking devices $D_1, D_2, \ldots, D_N$ may include suitable power diodes, each having an anode terminal (the third terminal $T_3$) electrically connected to the first terminal $T_1$ of a corresponding storage capacitor $C_1, C_2, \ldots, C_N$ and a cathode terminal (the fourth terminal $T_4$) electrically connected to the DC bus.

According to other embodiments of the disclosure (not shown), however, the blocking devices $D_1, D_2, \ldots, D_N$ may include suitable power transistors (e.g., IGBTs or equivalent devices) configured to allow the flow of a current along a predefined direction only.

According to example embodiments of the disclosure, the power supply apparatus 1 includes a control unit 3 including suitable data processing resources, for example one or more microprocessors or other data processing devices configured to execute suitable software instructions stored in a memory.

The control unit 3 may be configured to control the operation of the AC/DC conversion stage 2, the current limiters $B_1, B_2, \ldots, B_N$ and the capacitor dischargers $E_1, E_2, \ldots, E_N$ through suitable control signals CS.

In some cases, the control unit 3 may be integrated in the AC/DC conversion stage 2. According to other embodiments of the disclosure, however, the control unit 3 may be a stand-alone device or integrated in a suitable IED (Intelligent Electronic Device), for example a control & protection relay.

The power supply apparatus 1 may include a plurality of sensor units $S_1, S_2, \ldots, S_N$.

Each sensor unit $S_1, S_2, \ldots, S_N$ is configured to provide the control unit 3 with suitable detection signals DS indicative of currents and voltages at the first terminal $T_3$ of a corresponding storage capacitor $C_1, C_2, \ldots, C_N$.

In general, the sensor units $S_1, S_2, \ldots, S_N$ may be realized at industrial level according to solutions of known type. For example, they may include suitable capacitive devices amperometric transformers to detect voltages and currents at the first terminal $T_3$, respectively.

According to an aspect of the disclosure, the control unit 3 is configured to carry out a diagnostic procedure 100 of the storage capacitors C1, C2, . . . , CN.

In order to carry out the diagnostic procedure 100, the control unit 3 acquires and process the detection signals DS sent by the above-mentioned sensors units $S_1, S_2, \ldots, S_N$ and sends suitable control signals to the AC/DC conversion unit 2, the current limiters $B_1, B_2, \ldots, B_N$ and the capacitor dischargers $E_1, E_2, \ldots, E_N$.

Initially, the diagnostic procedure 100 includes a first diagnostic sequence directed to check whether one or more storage capacitors $C_1, C_2, \ldots, C_N$ have to be subject to a reforming process before reaching a nominal charging level.

Figure 2:
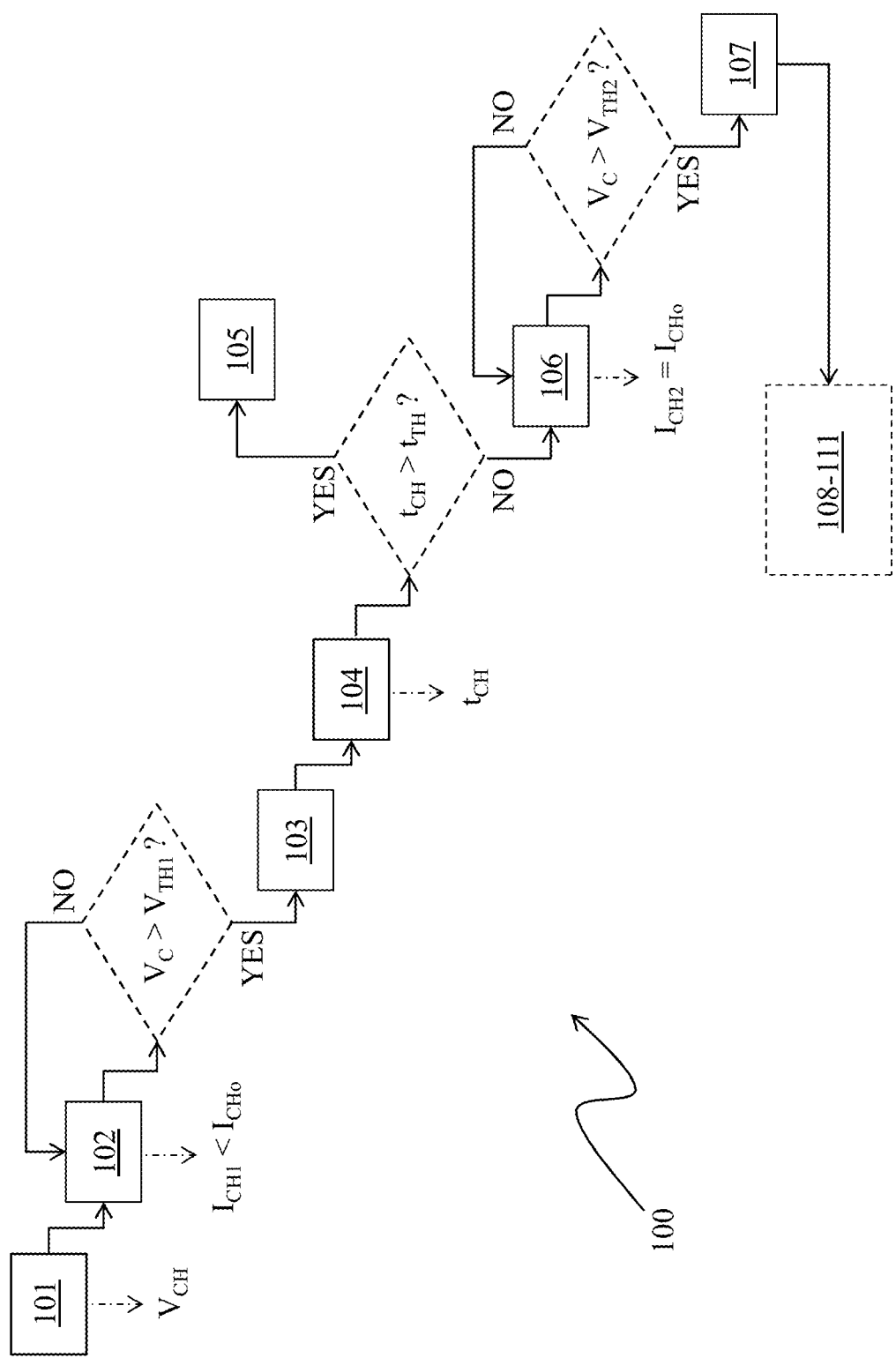
FIGS. 2 and 3 are block schemes related to the operation of the power supply apparatus, according to the disclosure.
Figure 3:
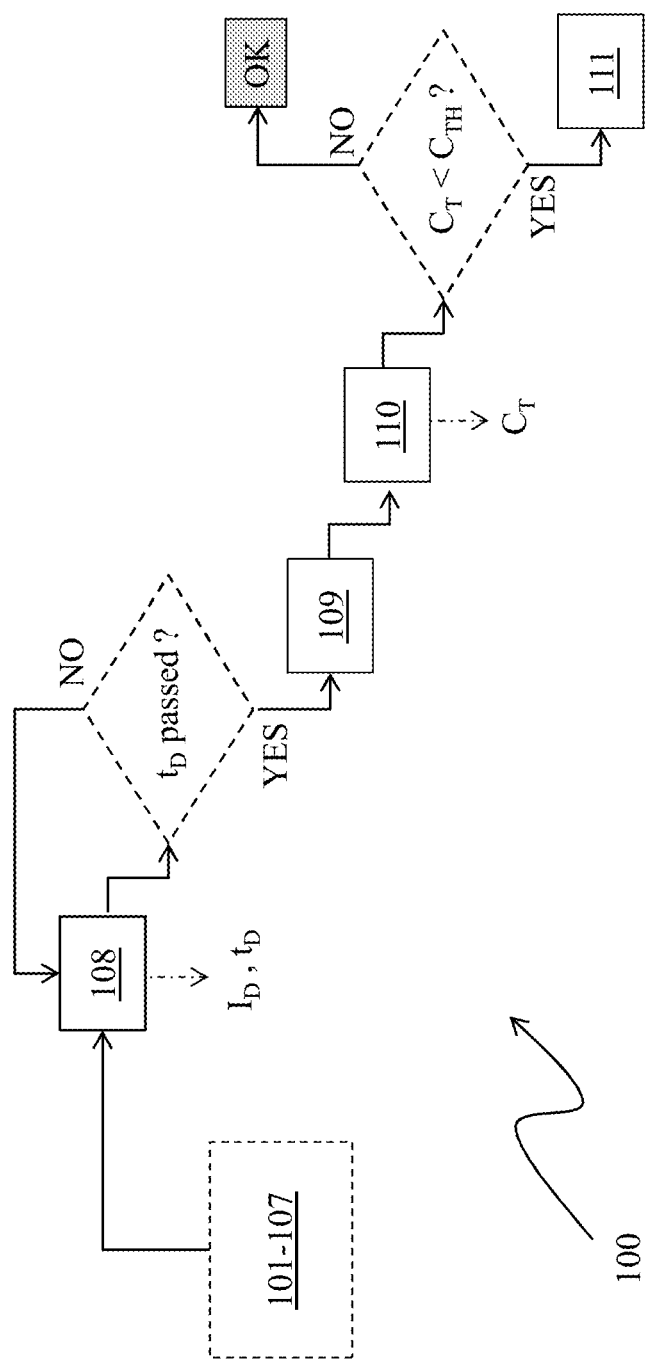

Referring now to FIG. 2, the diagnostic procedure 100 includes a step 101, in which the control unit 3 commands the AC/DC conversion unit 2 to provide in output a DC charging voltage $V_{CH}$.

The diagnostic procedure 100 then includes the step 102, in which the control unit 3 commands each current limiter $B_1, B_2, \ldots, B_N$ to set a first charging current $I_{CH1}$ lower than a predefined charging current $I_{CHo}$ (for example a nominal charging current) to charge the corresponding storage capacitor $C_1, C_2, \ldots, C_N$.

In practice, the control unit 3 commands to carry out a light charging process of the storage capacitors $C_1, C_2, \ldots, C_N$, in which each storage capacitor is charged through a charging current $I_{CH1}$ having a magnitude lower than the nominal charging current $I_{CHo}$ normally charging said storage capacitor.

The diagnostic procedure 100 then includes the step 103, in which the control unit 3 commands each current limiter $B_1, B_2, \ldots, B_N$ to block the charge of the corresponding storage capacitor $C_1, C_2, \ldots, C_N$, when the voltage $V_C$ across said storage capacitor is higher than a first threshold voltage value $V_{TH1}$.

In practice, each storage capacitor $C_1, C_2, \ldots, C_N$ is charged as described above until the voltage $V_C$ across said storage capacitor reaches a predefined charging level corresponding to the first threshold voltage value $V_{TH1}$. Each current limiter $B_1, B_2, \ldots, B_N$ is capable of blocking the charge of the corresponding storage capacitor $C_1, C_2, \ldots, C_N$ by setting a null charging current ($I_{CH}=0$) for said storage capacitor.

At the following step 104 of the diagnostic procedure 100, the control unit 3 calculates, for each storage capacitor $C_1, C_2, \ldots, C_N$, a charging time $t_{CH}$ taken by the voltage $V_C$ across of said storage capacitor to reach said first threshold voltage value $V_{TH1}$. In practice, the control unit 3 calculates the charging time $t_{CH}$ to charge each storage capacitor $C_1, C_2, \ldots, C_N$ at the first threshold voltage value $V_{TH1}$.

The control unit 3 then compares the calculated charging time $t_{CH}$ of each storage capacitor $C_1, C_2, \ldots, C_N$ with a predefined threshold charging time $t_{TH}$.

If the charging time $t_{CH}$ of a given storage capacitor is higher than the threshold charging time $t_{TH}$, the control unit 3 determines that a reforming process of said storage capacitor is needed.

Advantageously, the control unit 3 is configured to signal to a user or a remote computerized device such a situation, for example in a visual manner, in an audible manner or by transmitting an alarm message.

The reforming process of a generic storage capacitor may be carried out in a known manner, according to the needs.

If the charging time $t_{CH}$ of each storage capacitor $C_1, C_2, \ldots, C_N$ is lower than the threshold charging time $t_{TH}$, the diagnostic procedure 100 includes the step 106, in which the control unit 3 commands each current limiter $B_1, B_2, \ldots, B_N$ to set a second charging current $I_{CH2}$ equal to the above-mentioned predefined charging current $I_{CHo}$ to charge the corresponding storage capacitor $C_1, C_2, \ldots, C_N$.

In practice, the control unit 3 commands to carry out a full charging process of the storage capacitors $C_1, C_2, \ldots, C_N$, in which each storage capacitor is charged through a charging current $I_{CH1}$ having a magnitude corresponding to the nominal charging current $I_{CHo}$.

At this stage, the control unit 3 carries out a second diagnostic sequence directed to identify whether one or more $C_1, C_2, \ldots, C_N$ are subject to fault conditions.

The diagnostic procedure 100 then includes a step 108, in which the control unit 3 commands each capacitor discharger $E_1, E_2, E_N$ to discharge a corresponding storage capacitor $C_1, C_2, \ldots, C_N$ for a predefined discharge time $t_D$ and with a discharging current $I_D$ corresponding to a predefined feeding current $I_F$ corresponding to the overall current absorbed by the electric loads $L_1, L_2, L_M$ electrically connected to the DC bus 7 in normal conditions.

In practice, the control unit 3 commands each capacitor discharger $E_1, E_2, E_N$ to discharge each $C_1, C_2, \ldots, C_N$ in a controlled way, according to predefined discharging parameters.

At the step 109 of the diagnostic procedure 100, the control unit 3 commands each capacitor discharger $E_1, E_2, E_N$ to block the discharge of the corresponding storage capacitor $C_1, C_2, \ldots, C_N$, when the above-mentioned predefined discharge time $t_D$ has passed.

At the following step 110 of the diagnostic procedure 100, the control unit 3 calculates, for each storage capacitor $C_1, C_2, \ldots, C_N$, a capacitance value $C_T$. This latter may be easily calculated based on the detection signals DS provided by the sensor units $C_1, C_2, \ldots, C_N$ operatively coupled to the storage capacitors $C_1, C_2, \ldots, C_N$.

The control unit 3 then compares the calculated capacitance value $C_T$ of each storage capacitor $C_1, C_2, \ldots, C_N$ with a predefined threshold capacitance value $C_{TH}$.

If the calculated capacitance value $C_T$ of a given storage capacitor $C_1, C_2, \ldots, C_N$ is lower than the threshold capacitance value $V_{TH}$, the control unit 3 determines that a dielectric fault of said storage capacitor is needed.

Advantageously, the control unit 3 is configured to signal to a user or a remote computerized device such a situation, for example in a visual manner, in an audible manner or by transmitting an alarm message.

If the calculated capacitance value $C_T$ of a given storage capacitor $C_1, C_2, \ldots, C_N$ is higher than or equal to the threshold capacitance value $V_{TH}$, the control unit 3 determines that said storage capacitor operates correctly.

The control unit 3 can advantageously carry out the diagnostic procedure 100 cyclically, according to the needs. In this way, the operating conditions of the storage capacitors $C_1, C_2, \ldots, C_N$ can be periodically checked, according to the needs.

The power supply apparatus of the disclosure has a number of advantages with respect to similar systems of known type.

The power supply apparatus provides improved performances in terms of reliability in operation. By virtue of the arrangement of the blocking devices $B_1, B_2, \ldots, B_N$ between the capacitor bank 4 and the DC bus 7, each storage capacitor $C_1, C_2, \ldots, C_N$ can be isolated from the remaining storage capacitors in case of fault conditions. The fault in a given storage capacitor cannot therefore be fed by the remaining storage capacitors. As a result, the power supply apparatus can continue to feed the electric loads $L_1, L_2, \ldots, L_M$ by exploiting the non-faulted storage capacitors.

The power supply apparatus, according to the disclosure, provides improved performances in terms of diagnostics of the storage capacitors. The operating conditions of the storage capacitors $C_1, C_2, \ldots, C_N$ can be periodically checked in an automatic way without the need of arranging a dedicated diagnostics setup but simply exploiting the hardware resources already installed for the normal operation of the storage capacitors.

The power supply apparatus, according to the disclosure has a compact size and a simple overall structure and it relatively easy and cheap to manufacture at industrial level.

What is claimed is:

1. A power supply apparatus for an electric system comprising:
    an AC/DC conversion unit electrically connectable to an AC electric power source, said AC/DC conversion unit configured to receive an AC input voltage ($V_{AC}$) and provide in output a DC charging voltage ($V_{CH}$);
    a plurality of storage capacitors ($C_1, C_2, C_N$) operatively coupled to said AC/DC conversion unit to be charged in parallel by said AC/DC conversion unit, each storage capacitor having a first terminal ($T_1$) configured to receive a charging current ($I_{CH}$) provided by said AC/DC conversion unit;
    a DC bus electrically connectable to one or more electric loads ($L_1, L_2, L_M$), said DC bus configured to feed said electric loads with a DC feeding voltage ($V_F$);
    wherein the power supply apparatus comprises a plurality of current blocking devices ($D_1, D_2, D_N$), each current blocking device having a third terminal ($T_3$) electrically connected to the first terminal ($T_1$) of a corresponding storage capacitor ($C_1, C_2, C_N$) and a fourth terminal ($T_4$) electrically connected to said DC bus,
    wherein said current blocking devices are configured to allow a flow of feeding currents ($I_{F1}, I_{F2}, I_{FN}$) from said storage capacitors ($C_1, C_2, C_N$) to said electric loads ($L_1, L_2, L_M$) and are configured to block currents having opposite directions relative to said feeding currents ($I_{F1}, I_{F2}, I_{FN}$), and
    wherein each blocking device ($D_1, D_2, D_N$) switches in an interdiction state, when the corresponding storage capacitor ($C_1, C_2, C_N$) is subject to a fault, and prevents that feeding currents ($I_{F2}, I_{FN}$) provided by the remaining storage capacitors ($C_2, C_N$) flow through the storage capacitor ($C_1, C_2, C_N$) subject to a fault.

2. The power supply apparatus according to claim 1, wherein the power supply apparatus comprises a plurality of current limiters ($B_1, B_2, B_N$), each current limiter electrically connected in series between said AC/DC conversion unit and a corresponding storage capacitor ($C_1, C_2, C_N$) and configured to set a charging current ($I_{CH}$) provided by said AC/DC conversion unit to charge the corresponding storage capacitor ($C_1, C_2, C_N$) depending on control signals (CS) received in input.

3. The power supply apparatus according to claim 1, wherein the power supply apparatus comprises a plurality of capacitor dischargers ($E_1, E_2, E_N$), each capacitor discharger electrically connected in parallel to a corresponding storage capacitor ($C_1, C_2, C_N$) and configured to discharge the corresponding storage capacitor ($C_1, C_2, C_N$) with a selectable discharging current ($I_D$).

4. The power supply apparatus according to claim 3, wherein the power supply apparatus comprises a control unit, said control unit including data processing resources, said a control unit configured to control an operation of said AC/DC conversion unit, said current limiters ($B_1, B_2, B_N$), and said capacitor dischargers ($E_1, E_2, E_N$).

5. The power supply apparatus according to claim 4, wherein the power supply apparatus comprises a plurality of sensor units ($S_1, S_2, S_N$), each sensor unit configured to provide said control unit with detection signals (DS) indicative of currents and voltages at the first terminal ($T_1$) of a corresponding storage capacitor ($C_1, C_2, C_N$).

6. The power supply apparatus according to claim 4, wherein said control unit is configured to carry out a diagnostic procedure of said storage capacitors ($C_1, C_2, C_N$), and wherein a charging management procedure includes the following steps:
    commanding said AC/DC conversion unit to provide in output a DC charging voltage ($V_{CH}$);
    for each storage capacitor ($C_1, C_2, C_N$), commanding the corresponding current limiter ($B_1, B_2, B_N$) to set a first charging current ($I_{CH1}$) lower than a predefined charging current ($I_{CHo}$);
    for each storage capacitor ($C_1, C_2, C_N$), commanding the corresponding current limiter ($B_1, B_2, B_N$) to block the charge of said storage capacitor, when a voltage ($V_C$) across said storage capacitor ($C_1, C_2, C_N$) is higher than a first threshold voltage value ($V_{TH1}$);
    for each storage capacitor ($C_1, C_2, C_N$), calculating a charging time ($t_{CH}$) taken by the voltage ($V_C$) across of said storage capacitor ($C_1, C_2, C_N$) to reach said first threshold voltage value ($V_{TH1}$); and
    determining that a reforming process of a storage capacitor ($C_1, C_2, C_N$) is needed, if the charging time ($t_{CH}$) of said storage capacitor is higher than a threshold charging time ($t_{TH}$).

7. The power supply apparatus according to claim 6, wherein, if the charging time ($t_{CH}$) of each storage capacitor ($C_1, C_2, C_N$) is lower than or equal to said threshold charging time ($t_{TH}$), said diagnostic procedure includes the following steps:
    for each storage capacitor ($C_1, C_2, C_N$), commanding the corresponding current limiter ($B_1, B_2, B_N$) to set a second charging current ($I_{CH2}$) corresponding to said predefined charging current ($I_{CHo}$); and
    for each storage capacitor ($C_1, C_2, C_N$), commanding the corresponding current limiter ($B_1, B_2, B_N$) to block the charge of said storage capacitor, when the voltage ($V_C$) across said storage capacitor ($C_1, C_2, C_N$) is higher than a second threshold voltage value ($V_{TH2}$).

8. The power supply apparatus according to claim 7, wherein said diagnostic procedure further includes the following steps:
- for each storage capacitor ($C_1$, $C_2$, $C_N$), commanding the corresponding capacitor discharger ($E_1$, $E_2$, $E_N$) to discharge said storage capacitor for a predefined discharge time ($t_D$) with a discharging current ($I_D$) corresponding to a predefined feeding current ($I_F$) absorbed by said one or more electric loads ($L_1$, $L_2$, $L_M$);
- for each storage capacitor ($C_1$, $C_2$, $C_N$), commanding the corresponding capacitor discharger ($E_1$, $E_2$, $E_N$) to block the discharge of said storage capacitor, when said predefined discharge time ($t_D$) has passed;
- for each storage capacitor ($C_1$, $C_2$, $C_N$), calculating a capacitance value ($C_T$); and
- for each storage capacitor ($C_1$, $C_2$, $C_N$), determining that a dielectric fault is present, if the calculated capacitance value ($C_T$) is lower than a threshold capacitance value ($C_{TH}$).

9. A medium-voltage electric installation, wherein the medium-voltage electric installation comprises a power supply apparatus, according to claim 1.

10. The medium-voltage electric installation according to claim 9, wherein the medium-voltage installation is a subsea electric installation.

11. The power supply apparatus according to claim 5, wherein said control unit is configured to carry out a diagnostic procedure of said storage capacitors ($C_1$, $C_2$, $C_N$), and wherein a charging management procedure includes the following steps:
- commanding said AC/DC conversion unit to provide in output a DC charging voltage ($V_{CH}$);
- for each storage capacitor ($C_1$, $C_2$, $C_N$), commanding the corresponding current limiter ($B_1$, $B_2$, $B_N$) to set a first charging current ($I_{CH1}$) lower than a predefined charging current ($I_{CHo}$);
- for each storage capacitor ($C_1$, $C_2$, $C_N$), commanding the corresponding current limiter ($B_1$, $B_2$, $B_N$) to block the charge of said storage capacitor, when the voltage ($V_C$) across said storage capacitor ($C_1$, $C_2$, $C_N$) is higher than a first threshold voltage value ($V_{TH1}$);
- for each storage capacitor ($C_1$, $C_2$, $C_N$), calculating a charging time ($t_{CH}$) taken by the voltage ($V_C$) across of said storage capacitor ($C_1$, $C_2$, $C_N$) to reach said first threshold voltage value ($V_{TH1}$); and
- determining that a reforming process of a storage capacitor ($C_1$, $C_2$, $C_N$) is needed, if the charging time ($t_{CH}$) of said storage capacitor is higher than said threshold charging time ($t_{TH}$).

\* \* \* \* \*